US007769756B2

(12) United States Patent
Krikorian et al.

(10) Patent No.: US 7,769,756 B2
(45) Date of Patent: Aug. 3, 2010

(54) SELECTION AND PRESENTATION OF CONTEXT-RELEVANT SUPPLEMENTAL CONTENT AND ADVERTISING

(75) Inventors: Jason Krikorian, San Mateo, CA (US);
Blake Krikorian, San Mateo, CA (US);
Brian Meckler, Kensington, CA (US)

(73) Assignee: Sling Media, Inc., Foster City, CA (US)

( * ) Notice: Subject to any disclaimer, the term of this patent is extended or adjusted under 35 U.S.C. 154(b) by 259 days.

(21) Appl. No.: 11/683,862

(22) Filed: Mar. 8, 2007

(65) Prior Publication Data
US 2007/0234213 A1 Oct. 4, 2007

Related U.S. Application Data

(63) Continuation-in-part of application No. 11/147,664, filed on Jun. 7, 2005.

(60) Provisional application No. 60/780,709, filed on Mar. 8, 2006, provisional application No. 60/577,833, filed on Jun. 7, 2004.

(51) Int. Cl.
*G06F 17/30* (2006.01)

(52) U.S. Cl. ........................................ 707/736

(58) Field of Classification Search ............... 707/1, 707/104.1, 736; 725/60; 705/14
See application file for complete search history.

(56) References Cited

U.S. PATENT DOCUMENTS 3,416,043 A   12/1968   Jorgensen
4,254,303 A   3/1981    Takizawa
5,161,021 A   11/1992   Tsai
5,237,648 A   8/1993    Mills et al.
5,386,493 A   1/1995    Degen et al.
5,434,590 A   7/1995    Dinwiddie, Jr. et al.
5,434,678 A   7/1995    Abecassis
5,438,423 A   8/1995    Lynch et al.
5,493,638 A   2/1996    Hooper et al.
5,602,589 A   2/1997    Vishwanath et al.
5,610,653 A   3/1997    Abecassis (Continued)

FOREIGN PATENT DOCUMENTS

CN   1464685   12/2003

(Continued)

OTHER PUBLICATIONS

Roe, Kevin, "Third-Party Observation Under EPC Article 115 on the Patentability Of An Invention," Dec. 21, 2007.

(Continued)

*Primary Examiner*—Etienne P LeRoux
(74) *Attorney, Agent, or Firm*—Ingrassia Fisher & Lorenz, P.C.

(57) ABSTRACT

Media content is paired with context-relevant supplemental content, and the media and supplemental content are provided to a user. A media stream containing the media content may be received from a source system, and context information about the media content is determined from information about the media stream. The supplemental content may be selected based on the determined context information. This may enable a business model in which third parties can register advertising or other supplemental content and specify the criteria that cause it to be combined with the media content.

61 Claims, 3 Drawing Sheets

U.S. PATENT DOCUMENTS

| | | | |
|---|---|---|---|
| 5,661,516 A | 8/1997 | Carles | |
| 5,666,426 A | 9/1997 | Helms | |
| 5,682,195 A | 10/1997 | Hendricks et al. | |
| 5,684,918 A | 11/1997 | Abecassis | |
| 5,696,869 A | 12/1997 | Abecassis | |
| 5,706,290 A | 1/1998 | Shaw et al. | |
| 5,708,961 A | 1/1998 | Hylton et al. | |
| 5,710,605 A | 1/1998 | Nelson | |
| 5,722,041 A | 2/1998 | Freadman | |
| 5,757,416 A | 5/1998 | Birch et al. | |
| 5,774,170 A | 6/1998 | Hite et al. | |
| 5,778,077 A | 7/1998 | Davidson | |
| 5,794,116 A | 8/1998 | Matsuda et al. | |
| 5,822,537 A | 10/1998 | Katseff et al. | |
| 5,831,664 A | 11/1998 | Wharton et al. | |
| 5,850,482 A | 12/1998 | Meany et al. | |
| 5,852,437 A | 12/1998 | Wugofski et al. | |
| 5,880,721 A | 3/1999 | Yen | |
| 5,892,536 A | 4/1999 | Logan et al. | |
| 5,898,679 A | 4/1999 | Brederveld et al. | |
| 5,909,518 A | 6/1999 | Chui | |
| 5,911,582 A | 6/1999 | Redford et al. | |
| 5,922,072 A | 7/1999 | Hutchinson et al. | |
| 5,936,968 A | 8/1999 | Lyons | |
| 5,953,485 A | 9/1999 | Abecassis | |
| 5,968,132 A | 10/1999 | Tokunaga | |
| 5,987,501 A | 11/1999 | Hamilton et al. | |
| 6,002,450 A | 12/1999 | Darbee et al. | |
| 6,008,777 A | 12/1999 | Yiu | |
| 6,008,802 A | 12/1999 | Iki et al. | |
| 6,014,694 A | 1/2000 | Aharoni et al. | |
| 6,020,880 A | 2/2000 | Naimpally | |
| 6,031,940 A | 2/2000 | Chui et al. | |
| 6,036,601 A | 3/2000 | Heckel | |
| 6,040,829 A | 3/2000 | Croy et al. | |
| 6,043,837 A | 3/2000 | Driscoll, Jr. et al. | |
| 6,049,671 A | 4/2000 | Slivka et al. | |
| 6,075,906 A | 6/2000 | Fenwick et al. | |
| 6,088,455 A | 7/2000 | Logan et al. | |
| 6,088,777 A | 7/2000 | Sorber | |
| 6,091,886 A | 7/2000 | Abecassis | |
| 6,097,441 A | 8/2000 | Allport | |
| 6,104,334 A | 8/2000 | Allport | |
| 6,108,041 A | 8/2000 | Faroudja et al. | |
| 6,115,420 A | 9/2000 | Wang | |
| 6,117,126 A | 9/2000 | Appelbaum et al. | |
| 6,141,059 A | 10/2000 | Boyce et al. | |
| 6,141,447 A | 10/2000 | Linzer et al. | |
| 6,151,444 A | 11/2000 | Abecassis | |
| 6,160,544 A | 12/2000 | Hayashi et al. | |
| 6,177,931 B1 | 1/2001 | Alexander et al. | |
| 6,201,536 B1 | 3/2001 | Hendricks et al. | |
| 6,208,805 B1 | 3/2001 | Abecassis | |
| 6,212,282 B1 | 4/2001 | Mershon | |
| 6,222,885 B1 | 4/2001 | Chaddha et al. | |
| 6,223,211 B1 | 4/2001 | Hamilton et al. | |
| 6,240,459 B1 | 5/2001 | Roberts et al. | |
| 6,240,531 B1 | 5/2001 | Spilo et al. | |
| 6,243,596 B1 | 6/2001 | Kikinis | |
| 6,256,019 B1 | 7/2001 | Allport | |
| 6,263,503 B1 | 7/2001 | Margulis | |
| 6,279,029 B1 | 8/2001 | Sampat et al. | |
| 6,282,714 B1 | 8/2001 | Ghori et al. | |
| 6,286,142 B1 | 9/2001 | Ehreth | |
| 6,310,886 B1 | 10/2001 | Barton | |
| 6,330,595 B1 | 12/2001 | Ullman et al. | |
| 6,340,994 B1 | 1/2002 | Margulis et al. | |
| 6,353,885 B1 | 3/2002 | Herzi et al. | |
| 6,356,945 B1 | 3/2002 | Shaw et al. | |
| 6,357,021 B1 | 3/2002 | Kitagawa et al. | |
| 6,389,467 B1 | 5/2002 | Eyal | |
| 6,408,128 B1 | 6/2002 | Abecassis | |
| 6,434,113 B1 | 8/2002 | Gubbi | |
| 6,442,067 B1 | 8/2002 | Chawla et al. | |
| 6,456,340 B1 | 9/2002 | Margulis | |
| 6,457,010 B1 | 9/2002 | Eldering et al. | |
| 6,466,623 B1 | 10/2002 | Youn et al. | |
| 6,470,378 B1 | 10/2002 | Tracton et al. | |
| 6,476,826 B1 | 11/2002 | Plotkin et al. | |
| 6,487,319 B1 | 11/2002 | Chai | |
| 6,493,874 B2 | 12/2002 | Humpleman | |
| 6,496,122 B2 | 12/2002 | Sampsell | |
| 6,505,169 B1 * | 1/2003 | Bhagavath et al. | 705/14 |
| 6,510,177 B1 | 1/2003 | De Bonet et al. | |
| 6,529,506 B1 * | 3/2003 | Yamamoto et al. | 370/389 |
| 6,553,147 B2 | 4/2003 | Chai et al. | |
| 6,553,178 B2 | 4/2003 | Abecassis | |
| 6,557,031 B1 | 4/2003 | Mimura et al. | |
| 6,564,004 B1 | 5/2003 | Kadono | |
| 6,567,984 B1 | 5/2003 | Allport | |
| 6,584,201 B1 | 6/2003 | Konstantinou et al. | |
| 6,584,559 B1 | 6/2003 | Huh et al. | |
| 6,597,375 B1 | 7/2003 | Yawitz | |
| 6,598,159 B1 | 7/2003 | McAlister et al. | |
| 6,600,838 B2 | 7/2003 | Chui | |
| 6,609,253 B1 | 8/2003 | Swix et al. | |
| 6,611,530 B1 | 8/2003 | Apostolopoulos | |
| 6,628,716 B1 | 9/2003 | Tan et al. | |
| 6,642,939 B1 | 11/2003 | Vallone et al. | |
| 6,647,015 B2 | 11/2003 | Malkemes et al. | |
| 6,658,019 B1 | 12/2003 | Chen et al. | |
| 6,665,751 B1 | 12/2003 | Chen et al. | |
| 6,665,813 B1 | 12/2003 | Forsman et al. | |
| 6,697,356 B1 | 2/2004 | Kretschmer et al. | |
| 6,698,020 B1 | 2/2004 | Zigmond et al. | |
| 6,701,380 B2 | 3/2004 | Schneider et al. | |
| 6,704,678 B2 | 3/2004 | Minke et al. | |
| 6,704,847 B1 | 3/2004 | Six et al. | |
| 6,708,231 B1 | 3/2004 | Kitagawa | |
| 6,718,551 B1 | 4/2004 | Swix et al. | |
| 6,754,266 B2 | 6/2004 | Bahl et al. | |
| 6,754,439 B1 | 6/2004 | Hensley et al. | |
| 6,757,851 B1 | 6/2004 | Park et al. | |
| 6,757,906 B1 | 6/2004 | Look et al. | |
| 6,766,376 B2 | 7/2004 | Price | |
| 6,768,775 B1 | 7/2004 | Wen et al. | |
| 6,771,828 B1 | 8/2004 | Malvar | |
| 6,774,912 B1 | 8/2004 | Ahmed et al. | |
| 6,781,601 B2 | 8/2004 | Cheung | |
| 6,785,700 B2 | 8/2004 | Masud et al. | |
| 6,795,638 B1 | 9/2004 | Skelley, Jr. | |
| 6,798,838 B1 | 9/2004 | Ngo | |
| 6,806,909 B1 | 10/2004 | Radha et al. | |
| 6,807,308 B2 | 10/2004 | Chui et al. | |
| 6,816,194 B2 | 11/2004 | Zhang et al. | |
| 6,816,858 B1 | 11/2004 | Coden et al. | |
| 6,826,242 B2 | 11/2004 | Ojard et al. | |
| 6,834,123 B2 | 12/2004 | Acharya et al. | |
| 6,839,079 B2 | 1/2005 | Barlow et al. | |
| 6,847,468 B2 | 1/2005 | Ferriere | |
| 6,850,571 B2 | 2/2005 | Tardif | |
| 6,850,649 B1 | 2/2005 | Malvar | |
| 6,868,083 B2 | 3/2005 | Apostolopoulos et al. | |
| 6,889,385 B1 | 5/2005 | Rakib et al. | |
| 6,892,359 B1 | 5/2005 | Nason et al. | |
| 6,898,583 B1 | 5/2005 | Rising, III | |
| 6,907,602 B2 | 6/2005 | Tsai et al. | |
| 6,927,685 B2 | 8/2005 | Wathen | |
| 6,930,661 B2 | 8/2005 | Uchida et al. | |
| 6,931,451 B1 | 8/2005 | Logan et al. | |
| 6,941,575 B2 | 9/2005 | Allen | |
| 6,944,880 B1 | 9/2005 | Allen | |
| 6,952,595 B2 | 10/2005 | Ikedo et al. | |
| 6,981,050 B1 | 12/2005 | Tobias et al. | |

| | | |
|---|---|---|
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,055,166 B1 | 5/2006 | Logan et al. |
| 7,058,376 B2 | 6/2006 | Logan et al. |
| 7,079,176 B1 | 7/2006 | Freeman et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,360 B2 | 9/2008 | Abecassis |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,661,121 B2 | 2/2010 | Smith et al. |
| 2001/0021998 A1 | 9/2001 | Margulis |
| 2002/0004839 A1* | 1/2002 | Wine et al. .............. 709/231 |
| 2002/0010925 A1 | 1/2002 | Kikinis |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0120925 A1 | 8/2002 | Logan |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0093790 A1 | 5/2003 | Logan et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1* | 10/2003 | Erhart et al. .............. 704/270.1 |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1* | 1/2004 | Billmaier .................. 725/60 |
| 2004/0040042 A1 | 2/2004 | Feinleib |
| 2004/0052216 A1 | 3/2004 | Roh |
| 2004/0068334 A1 | 4/2004 | Tsai et al. |
| 2004/0100486 A1 | 5/2004 | Flamini et al. |
| 2004/0103340 A1 | 5/2004 | Sundareson et al. |
| 2004/0139047 A1* | 7/2004 | Rechsteiner et al. ........... 707/1 |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1* | 10/2004 | Kaneko .................. 725/135 |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2004/0255330 A1 | 12/2004 | Logan |
| 2004/0255334 A1 | 12/2004 | Logan |
| 2004/0255336 A1 | 12/2004 | Logan et al. |
| 2005/0005308 A1 | 1/2005 | Logan et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |

| | | |
|---|---|---|
| 2005/0044058 A1 | 2/2005 | Matthews et al. |
| 2005/0053356 A1 | 3/2005 | Mate et al. |
| 2005/0055595 A1 | 3/2005 | Frazer et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1* | 9/2005 | Hull et al. .................. 715/764 |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0262539 A1 | 11/2005 | Barton et al. |
| 2005/0283791 A1 | 12/2005 | McCarthy |
| 2005/0288999 A1 | 12/2005 | Lerner et al. |
| 2006/0011371 A1 | 1/2006 | Fahey |
| 2006/0015925 A1 | 1/2006 | Logan |
| 2006/0031381 A1 | 2/2006 | Van Luijt et al. |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | van Beek |
| 2006/0095943 A1 | 5/2006 | Demircin et al. |
| 2006/0117371 A1 | 6/2006 | Margulis |
| 2006/0146174 A1 | 7/2006 | Hagino |
| 2006/0280157 A1 | 12/2006 | Karaoguz et al. |
| 2006/0280437 A1 | 12/2006 | Logan et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0113250 A1 | 5/2007 | Logan et al. |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0286596 A1 | 12/2007 | Lonn |
| 2007/0300258 A1 | 12/2007 | O'Connor et al. |
| 2008/0019276 A1 | 1/2008 | Takatsuji et al. |
| 2008/0036917 A1 | 2/2008 | Pascarella et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0163045 A1 | 7/2008 | St. John-Larkin |
| 2008/0195744 A1 | 8/2008 | Bowra et al. |
| 2008/0199150 A1 | 8/2008 | Candelore |
| 2008/0294759 A1 | 11/2008 | Biswas et al. |
| 2009/0199248 A1 | 8/2009 | Ngo et al. |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| KR | 19990082855 A | 11/1999 |
| KR | 20010211410 A | 8/2001 |
| WO | 0133839 A1 | 5/2001 |
| WO | 01033839 A1 | 5/2001 |
| WO | 01047248 A2 | 6/2001 |
| WO | 2001093161 A1 | 12/2001 |
| WO | 03026232 A1 | 3/2003 |
| WO | 03052552 A2 | 6/2003 |
| WO | 2003098897 | 11/2003 |
| WO | 2004032511 A1 | 4/2004 |
| WO | 2005050898 A2 | 6/2005 |
| WO | 20060074110 A | 7/2006 |
| WO | 2007141555 A2 | 12/2007 |

| | | |
|---|---|---|
| WO | 2007149466 A2 | 12/2007 |
| WO | 2008024723 | 2/2008 |

OTHER PUBLICATIONS

Roe, Kevin, Third-Party Submission For Published Application Under CFR §1.99, Mar. 26, 2008.
Skodras et al., "JPEG2000: The Upcoming Still Image Compression Standard," May 11, 2000, 14 pages.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Taubman et al., "Embedded Block Coding in JPEG2000," Feb. 23, 2001, pp. 1-8 of 36.
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
International Search Report and Written Opinion for PCT/US2006/04382, mailed April 27, 2007.
International Search Report for International Application No. PCT/US/2007/063599, mailed Dec. 12, 2007.
International Search Report for International Application No. PCT/US2007/076337 mailed Oct. 20, 2008.
Rao, Padmanabha R., Copy of U.S. Appl. No. 12/347,465, as filed on Dec. 31, 2008.
Krikorian, Jason, Copy of U.S. Appl. No. 11/734,277, as filed Apr. 12, 2007.
Tarra, Raghuveer et al., Copy of U.S. Appl. No. 60/975,239, as filed Sep. 26, 2007.
Rao, Padmanabha R., Copy of U.S. Appl. No. 12/166,039, as filed Jul. 1, 2008.
Williams, George Edward, Copy of U.S. Appl. No. 12/167041, as filed Jul. 2, 2008.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid +1056825330084&3ate+2003/07/01 &pagetype+printer§ion+1053801318705&path+articles/2003/06/30/0156825330084.html].
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www. tvbrick.com/en/affiliate/tvbs/tvbrick/document18/print>.
PCT International Search Report and Written Opinion, PCT/US2005/020105, Feb. 15, 2007, 6 pages.
Faucon, B., "TV 'Brick' Opens up Copyright Can of Worms," Financial Review, Jul. 1, 2003, [online] [Retrieved on Apr. 12, 2006] Retrieved from the Internet <URL:http://afr.com/cgi-bin/newtextversions.pl?storyid=1056825330084&date=2003/07/01 &pagetype= printer§ion=1053801318705&path=/articles/2003/06/30/1056825330084.html >.
Archive of "TV Brick Home Server," www.tvbrick.com, [online] [Archived by http://archive.org on Jun. 3, 2004; Retrieved on Apr. 12, 2006] Retrieved from the Internet <URL:http://web.archive.org/web/20041107111024/www.tvbrick.com/en/affiliate/tvbs/tvbrick/tvbrick/document18_print >.
PCT International Search Report and Written Opinion, PCT/US05/20105, Feb. 15, 2007, 6 pages.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed May 15, 2009; U.S. Appl. No. 11/147,664, filed Jun. 7, 2005.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.

Bajpai, Parimal et al. "Systems and Methods of Controlling the Encoding of a Media Stream," copy of U.S. Appl. No. 12/339,878, as filed on Dec. 19, 2008.
Malone, Edward D. et al. "Systems and Methods for Controlling Media Devices," copy of U.S. Appl. No. 12/256,344, as filed on Oct. 22, 2008.
Banger, Shashidhar et al. "Systems and Methods for Determining Attributes of Media Items Accessed Via a Personal Media Broadcaster," copy of U.S. Appl. No. 12/334,959, as filed on Dec. 15, 2008.
Kulkarni, Anant Madhava "Systems and Methods for Creating Logical Media Streams for Media Storage and Playback," copy of U.S. Appl. No. 12/323,907, as filed on Nov. 26, 2008.
Rao, Padmanabha R. "Systems and Methods for Linking Media Content," copy of U.S. Appl. No. 12/359,784, as filed on Jan. 26, 2009.
Krikorian, Blake Gary et al. "Systems and Methods for Presenting Media Content Obtained From Multiple Sources," copy of U.S. Appl. No. 12/408,456, as filed on Mar. 20, 2009.
Krikorian, Blake Gary et al. "Systems and Methods for Projecting Images From a Computer System," copy of U.S. Appl. No. 12/408,460, as filed on Mar. 20, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report and Written Opinion for International Application No. PCT/US2008/080910, mailed Feb. 16, 2009.
International Search Report and Written Opinion for International Application No. PCT/US2006/025912, mailed Jul. 17, 2008.
International Search Report for International Application No. PCT/US2008/059613, mailed Jul. 21, 2008.
Wikipedia "Location Fee Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control—Controlling-Your-Computer-With-a-Remote/?highlight=remote+control>; retrieved on Jan. 28, 2009.
Sony Corporation "LocationFree Player Pak—LocationFree Base Station—LocationFree Player" [Online]2005, XP002512401; retrieved from the Internet: <URL:http://www.docs.sony.com/release/LFPK1.pdf>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
China State Intellectual Property Office "First Office Action," issued Jul. 31, 2009, for Application No. 200580026825.X.
European Patent Office, International Searching Authority, "International Search Report," for International Application No. PCT/US2009/049006, mailed Sep. 11, 2009.
USPTO, Non-Final Office Action, mailed Aug. 4, 2009; U.S. Appl. No. 11/734,277, filed Apr. 12, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278 filed on Aug. 18, 2009.
Malode, Deepak Ravi "Remote Control and Method for Automatically Adjusting the Volume Output of an Audio Device," U.S. Appl. No. 12/550,145 filed Aug. 28, 2009.
Akella, Aparna Sarma "Systems and Methods for Event Programming Via a Remote Media Player," U.S. Appl. No. 12/537,057 filed on Aug. 6, 2009.
Shah, Bhupendra Natwerlan et al. "Systems and Methods for Transcoding and Place Shifting Media Content," U.S. Appl. No. 12/548,130 filed Aug. 26, 2009.
Banger, Shashidhar et al. "Systems and Methods for Automatically Controlling the Resolution of Streaming Video Content," U.S. Appl. No. 12/537,785, filed on Aug. 7, 2009.
Panigrahi, Biswaranjan "Home Media Aggregator System and Method," U.S. Appl. No. 12/538,681, filed on Aug. 10, 2009.
Nandury, Venkata Kishore "Adaptive Gain Control for Digital Audio Samples in a Media Stream," U.S. Appl. No. 12/507,971, filed on Jul. 23, 2009.
Shirali, Amey "Systems and Methods for Providing Programming Content," U.S. Appl. No. 12/538,676, filed on Aug. 10, 2009.
Thiyagarajan, Venkatesan "Systems and Methods for Virtual Remote Control of Streamed Media," U.S. Appl. No. 12/538,664, filed on Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed on Aug. 10, 2009.
Thiyagarajan, Venkatesan "Systems and Methods for Updating Firmware Over a Network," U.S. Appl. No. 12/538,661, filed on Aug. 10, 2009.
Iyer, Satish "Methods and Apparatus for Fast Seeking Within a Media Stream Buffer," U.S. Appl. No. 12/538,659 filed on Aug. 10, 2009.
Lucas, Brian et al. "Systems and Methods for Extablishing Connections Between Devices Communicating Over a Network," U.S. Appl. 12/426,103, filed on Apr. 17, 2009.
Conway, Frank et al. "Systems and Methods for Creating Variable Length Clips from a Media Stream," U.S. Appl. No. 12/347,465 filed on Dec. 31, 2008.
China State Intellectual Property Office "First Office Action," issued Jan. 8, 2010, for Application No. 200810126554.0.
USPTO, Final Office Action mailed Nov. 6, 2009; U.S. Appl. No. 09/809,868 filed Mar. 15, 2001.
USPTO, Final Office Action mailed Nov. 12, 2009; U.S. Appl. No. 11/620,707 filed Jan. 7, 2007.
USPTO, Non-Final Office Action mailed Oct. 1, 2009; U.S. Appl. No. 11/778,287 filed Jul. 16, 2007.
USPTO Final Office Action mailed Dec. 30, 2009; U.S. Appl. No. 11/147,664 filed Jun. 7, 2005.
USPTO Final Office action mailed Jan. 25, 2010; U.S. Appl. No. 11/734,277 filed Apr. 12, 2007.
International Search Report for PCT/US2008/069914 mailed Dec. 19, 2008.
PCT Partial International Search, PCT/US2009/054893, mailed Dec. 23, 2009.
European Patent Office, European Search Report, mailed Sep. 28, 2009 for European Application No. EP 06 78 6175.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

Srisuresh, P. et al. "Traditional IP Network Address Translator (Traditional NAT)," Network Working Group, The Internet Society, Jan. 2001.

Newton's Telcom Dictionary, 21st ed., Mar. 2005.

Thiyagarajan, Venkatesan et al. "Always-On-Top Media Player Launched From a Web Browser," U.S. Appl. No. 12/617,271, filed Nov. 12, 2009.

Paul, John Michael et al. "Systems and Methods for Delivering Messages Over a Network," U.S. Appl. No. 12/619,192, filed Nov. 16, 2009.

Rao, Padmanabha R. et al. "Methods and Apparatus for Establishing Network Connections Using an Inter-Mediating Device," U.S. Appl. No. 12/642,368, filed Dec. 18, 2009.

Dham, Vikram et al. "Systems and Methods for Establishing Network Connections Using Local Mediation Services," U.S. Appl. No. 12/644,918, filed Dec. 22, 2009.

Paul, John et al. "Systems and Methods for Remotely Controlling Media Server Via a Network," U.S. Appl. No. 12/645,870, filed Dec. 23, 2009.

Bajpal, Parimal et al. "Method and Node for Transmitting Data Over a Communication Network using Negative Ackhowledgement," U.S. Appl. No. 12/404,920, filed Mar. 16, 2009.

Bajpal, Parimal et al. "Method and Note for Employing Network connections Over a Connectinoless Transport Layer Protocol," U.S. Appl. No. 12/405,062, filed Mar. 16, 2009.

Asnis, Ilya et al. "Mediated Network address Translation Traversal" U.S. Appl. No. 12/405,039, filed Mar. 16, 2009.

Australian Government "Office Action," Australian Patent Application No. 2006240518, mailed Nov. 12, 2009.

Jain, Vikal Kumar "Systems and Methods for Coordinating Data Communication Between Two Device," U.S. Appl. No. 12/699,280, filed Feb. 3, 2010.

Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.

Paul, John et al. "Systems and Methods for Searching Media Content," U.S. Appl. No. 12/648,024 filed Dec. 28, 2009.

Carlson, T. "Mule 2.x Getting Started Guide," Apr. 15, 2008, 134 pages.

Curtis, Sean "Systems and Methods for Formatting Media Content for Distribution," U.S. Appl. No. 12/635,138, filed Dec. 10, 2009.

Newton's Telcom Dictionary, 20th ed., Mar. 2004.

"The Authoritative Dictionary of IEEE Standard Terms," 7th ed. 2000.

European Patent Office, International Searching Authority, "International Search Report," mailed Mar. 30, 2010; International Application PCT/US2009/068468 filed Dec. 27, 2009.

USPTO Final Office Action mailed Mar. 3, 2010; U.S. Appl. No. 11/111,265, filed Apr. 21, 2005.

USPTO Final Office Action mailed Mar. 12, 2010; U.S. Appl. No. 11/620,711, filed Jan. 7, 2007.

USPTO Non-Final Office Action mailed Mar. 19, 2010; U.S. Appl. No. 11/147,664, filed Jun. 7, 2005.

USPTO Non-Final Action mailed Mar. 31, 2010; U.S. Appl. No. 11/620,707,filed Jan. 7, 2007.

USPTO Non-Final Office Action mailed Apr. 1, 2010; U.S. Appl. No. 12/237,103, filed Sep. 24, 2008.

Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.

Gurzhi, Alexander et al. "Systems and Methods for Emulation Network-Enabled Media Components," U.S. Appl. No. 12/711,830, filed Feb. 24, 2010.

European Patent Office, European Search Report for European Application No. EP 08 16 7880, mailed Mar. 4, 2009.

Mythtv Wiki, "MythTV User Manual" [Online], Aug. 27, 2007, XP002515046; retrieved from the Internet: <URL:http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US2008/087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.

USPTO, Final Office Action mailed Feb. 9, 2009; U.S. Appl. No. 11/620,711, filed Jan. 7, 2007.

USPTO, Non-Final Office Action mailed May 15, 2009; U.S. Appl. No. 11/147,664, filed Jun. 7, 2005.

USPTO, Non-Final Office Action mailed Dec. 24, 2008; U.S. Appl. No. 11/147,985, filed Jun. 7, 2005.

USPTO, Non-Final Office Action mailed Jun. 25, 2008; U.S. Appl. No. 11/428,254, filed Jun. 30, 2006.

USPTO, Final Office Action mailed Feb. 6, 2009; U.S. Appl. No. 11/428,254, filed Jun. 30, 2006.

Sonic Blue "ReplayTV 5000 User's Guide," 2002, entire document.

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.

Microsoft Corporation; Harman/Kardon "Master Your Universe" 1999.

Matsushita Electric Corporation of America MicroCast : Wireless PC Multimedia Transceiver System, Nov. 1998.

"Wireless Local Area Networks: Issues in Technology and Standards" Jan. 6, 1999.

USPTO, Final Office Action mailed Jun. 25, 2009; U.S. Appl. No. 11/147,985, filed Jun. 7, 2005.

* cited by examiner

SELECTION AND PRESENTATION OF CONTEXT-RELEVANT SUPPLEMENTAL CONTENT AND ADVERTISING

CROSS REFERENCE TO RELATED APPLICATIONS

This application claims the benefit of U.S. Provisional Application No. 60/780,709, filed on Mar. 8, 2006, which is hereby incorporated by reference in its entirety; the application is also a continuation-in-part of U.S. application Ser. No. 11/147,664, filed on Jun. 7, 2005, which claims the benefit of U.S. Provisional Application No. 60/577,833, filed Jun. 7, 2004, both of which are hereby incorporated by reference in their entirety.

BACKGROUND

1. Field of the Invention

This invention relates generally to media applications, and in particular to presenting context-relevant supplemental content in a media player.

2. Background of the Invention

Television and other media content are increasingly finding a home on new devices. For example, television programming is no longer found solely on the television. Through computer networks, as well as other delivery mechanisms, media content can be consumed on electronic devices, such as personal computers and cellular phones.

Media content is often provided with supplemental content to the users (e.g., viewers, consumers) of the media content. This supplemental content can generate income for the content provider (e.g., advertising revenue for providing advertisements in television programs) and/or provide additional information to the users (e.g. display news scrollbar on top of a television program). However, the supplemental content provided generally is not relevant to the context of the particular user consuming the particular media content (e.g., the content of the media content, the user's preference, etc.), and therefore not of much interest to the user.

Accordingly, there is a need for a system and method to select context-relevant supplemental content for media content and present the supplemental content to users of the media content.

SUMMARY

Embodiments of the invention provide a system and method to select context-relevant supplemental content for media content and present the context-relevant supplemental content and the media content to users. In one embodiment, context information of the media content is determined; supplemental content is selected based on the context information and present to the users.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

Embodiments of the invention include systems and methods to pair media content with context-relevant (or context-specific) supplemental content and present the media content and the supplemental content to a user. In the following description, media content may include, without limitation, one or a combination of audio (including music, radio broadcasts, recordings, advertisements, etc.), video (including movies, video clips, television broadcasts, advertisements, etc.), data (such as streaming weather data), software (including video games, multimedia programs, graphics software), text and pictures. Media content may be in analog or digital form, and may be delivered as one or more individual files (e.g., media clip) or one or more media streams. Media streams can be encoded using any encoding technology and may be encrypted to protect their content using any suitable encryption technique.

Similar to media content, supplemental content may include one or a combination of the types of media content described above. One example of the supplemental content including a combination of different types of media content is a multimedia web page. The supplemental content may be interactive. For example, the content may be a hyperlink on which a user can click to obtain a web page that is relevant to the media stream. Alternatively, the content may comprise a communication link, such as a Voice over Internet Protocol (VoIP) call, or a button or other user interface device for placing such a call or initiating a software download.

Figure 1:
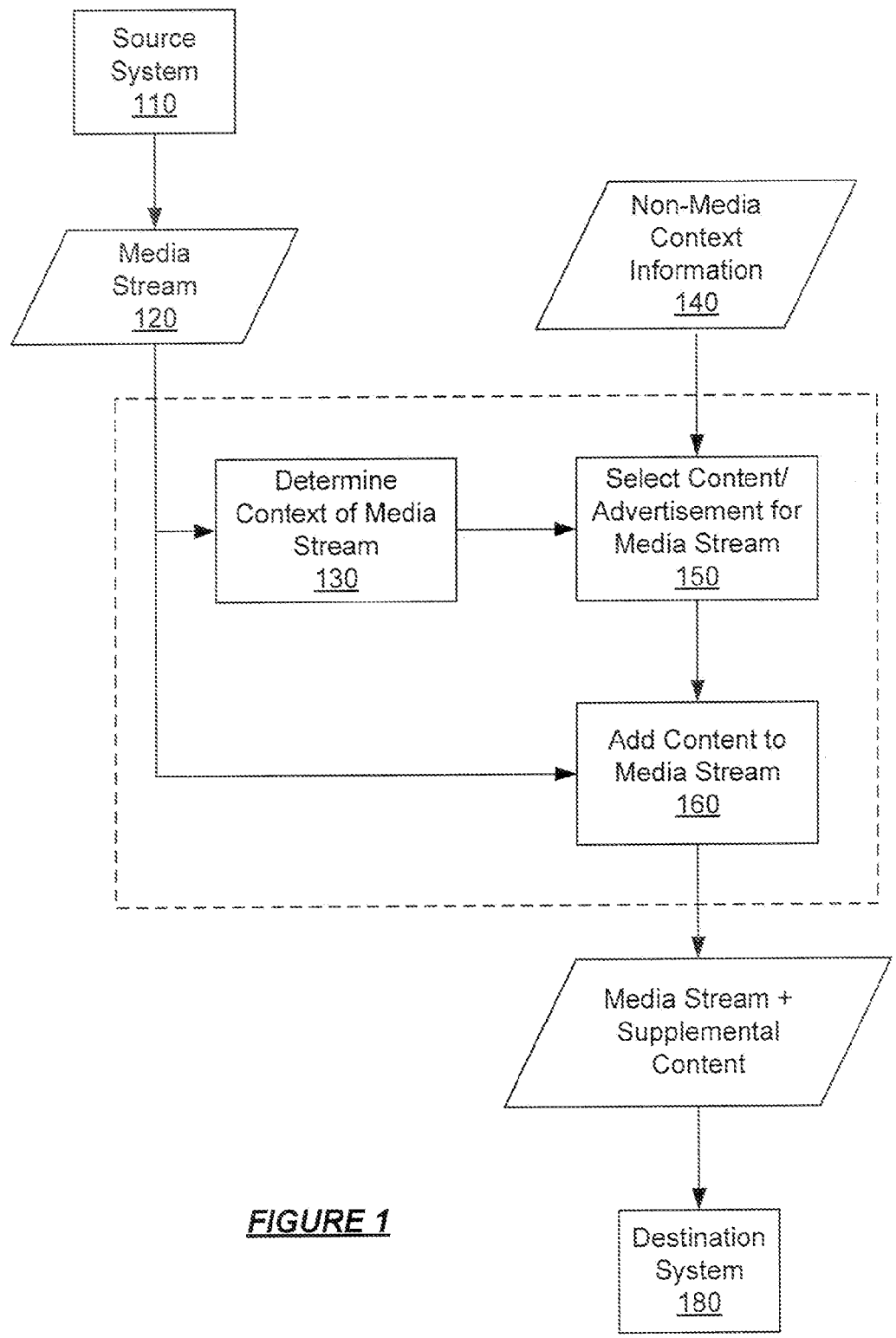
FIG. 1 is a flow diagram of a process for presenting context-relevant supplemental content to a user, according to one embodiment of the invention.

FIG. 1 shows a flow diagram of a process for presenting context-relevant supplemental content to a user according to one embodiment of the present invention. The process starts with a source system 110 (e.g., a television broadcasting station) transmitting a media stream 120 (e.g., a television program) to a context detection and supplemental content selection system ("the context system") (represented by a dashed line box in the FIG. 1).

The context system determines 130 context of the media stream and selects 150 content and/or advertisement for the media stream based on the determined context. In one embodiment, the context system can also receive non-media context information 140 (e.g., the user's preferences) from an external source and make the selection 150 based at least in part on the non-media context information. The context system can add 160 the selected content and/or advertisement (the context-relevant supplemental content) to the media stream. The context system can send the media stream and the supplemental content to the destination system 180, which can present the media stream and the context-relevant supplemental content to the user.

System Architecture

Figure 2:
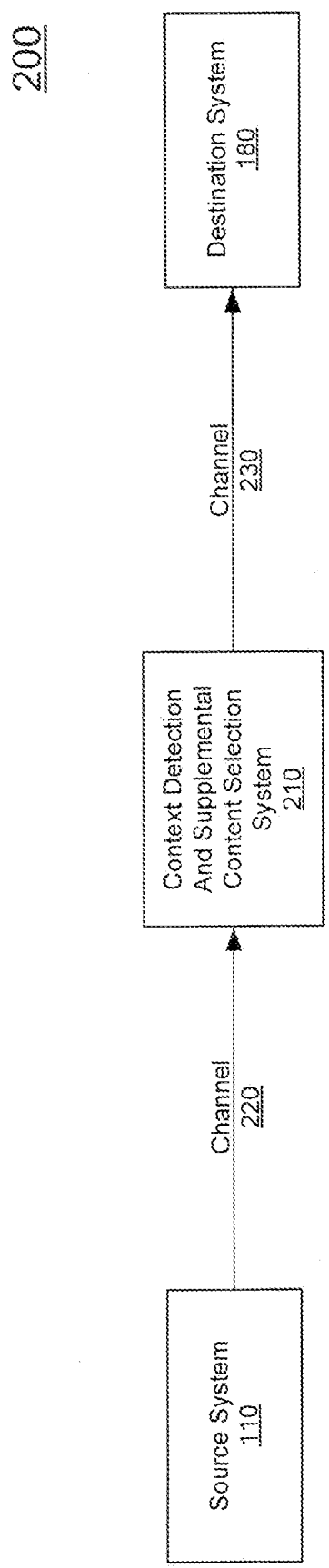
FIG. 2 is a system that includes a source system, a context detection and supplemental content selection system and a destination system, according to one embodiment of the invention.

FIG. 2 is a high-level block diagram of a system 200 according to one embodiment of the present invention. The system 200 includes a source system 110, a context detection and supplemental content selection system ("the context system") 210, and a destination system 180. A channel 220 exists between the source system 110 and the context system 210. A channel 230 exits between the context system 210 and the destination system 180.

The source system 110 includes hardware and/or software devices that are configured to transmit media content to the context system 210. It may be a central server at a remote broadcasting location, a network access server, a network storage device, or a computer at a user's home. Alternatively, the source system 110 may include multiple computers as in a peer-to-peer scenario. In one embodiment, the source system 110 can be a broadcast station (e.g., radio station and television station) that broadcasts media content over the air or through other channels such as cable networks. The source system 110 may provide services such as video on demand or pay-per-view. In another embodiment, the source system 110 can be an audio/video device such as a cable box, a satellite receiver, a DVD player, or a digital video recorder (DVR). In yet another embodiment, the source system 110 can be a time-shifting device (e.g., a personal video recorder) or a placeshifting device (e.g., a personal broadcaster).

In placeshifting, a user can watch or listen to live, recorded or stored media on a remote device via a data network. For example, a user may stream content from a first device at home (such as a satellite receiver, cable box, or digital video recorder) to a second device (such as a cellular phone), which can receive the media from across the house, across town, or across the world. This transmission may use public or private networks. A product that currently provides such a placeshifting application is the SLINGBOX™ from Sling Media, Inc., and described in U.S. application Ser. No. 11/147,664, filed Jun. 7, 2005, the contents of which are incorporated by reference in their entirety.

The context system 210 includes hardware and/or software devices that are configured to receive media content from the source system 110 through the channel 220, and determine context information of the media content. In one embodiment, the context system 210 is further configured to select context-relevant supplemental content of the received media content based at least in part on the determined context information, and send (or transmit) the supplemental content and the media content to the destination system 180 through the channel 230. In another embodiment, the context system 210 sends the context information to the destination system 180, which selects the context-relevant supplemental content based at least in part on the received context information and presents the supplemental content and the media content to users. In one embodiment, the context system 210 can be configured to convert the received media content from one media format to another or perform any other transcoding, encoding, translation, digitization (such as converting media content from analog form to digital form), or other processing on the media content as desired. In one embodiment, the context system 210 may transmit information to the source system 110.

The destination system 180 includes hardware and/or software devices that are configured to play the media content and the supplemental content to users (or viewers). The destination system 180 may include one or more output devices, such as a television, a speaker, a personal computer, a personal digital assistant (PDA), a cellular phone, a dedicated set top box that outputs to a television or monitor, or any other type of device that can receive and render media data. In one embodiment, the destinations system 180 may play the media content and the supplemental content in the same media output device(s) or different media output devices. In one embodiment, the destination system 180 can transmit information to the context system 210 and/or the source system 110.

In one embodiment, the source system 110, the context system 210, and the destination system 180 are structured to include a processor, memory, storage, network interfaces, and applicable operating system and other functional software (e.g., network drivers and communication protocols).

The channel 220 is the delivery pathway through which the source system 110 transmits the media content to the context system 210. The channel 230 is the delivery pathway through which the context system 210 transmits the media content and the supplemental content to the destination system 180. Media content and/or supplemental content may be delivered through a variety of pathways, including, but not limited to, the following: over the air via analog or digital radio frequency (RF) transmission; Internet protocol (IP) transmission delivered over a wired network or a wireless network (or a combination) in a unicast or multicast method; wireless or wired networks (which may or may not be IP) dedicated to the delivery of multimedia content (e.g., Qualcomm's MediaFLO); and satellite transmission. Therefore, the channels 220 and 230 may include, without limitation, one or a combination of air, wired or wireless network, and satellite. In one embodiment, the channel 220 and/or the channel 230 include the Internet. In another embodiment, the channel 220 and/or the channel 230 may be completely within a device, such as where the context system 210 is on the same device as the destination system 180 or the same device as the source system 110. For example, a computing system may be configured to stream media content to the destination system 180 and select and send context-relevant supplemental content to the destination system 180, thereby serving as both the source system 110 and the context system 210.

Operation

Figure 3:
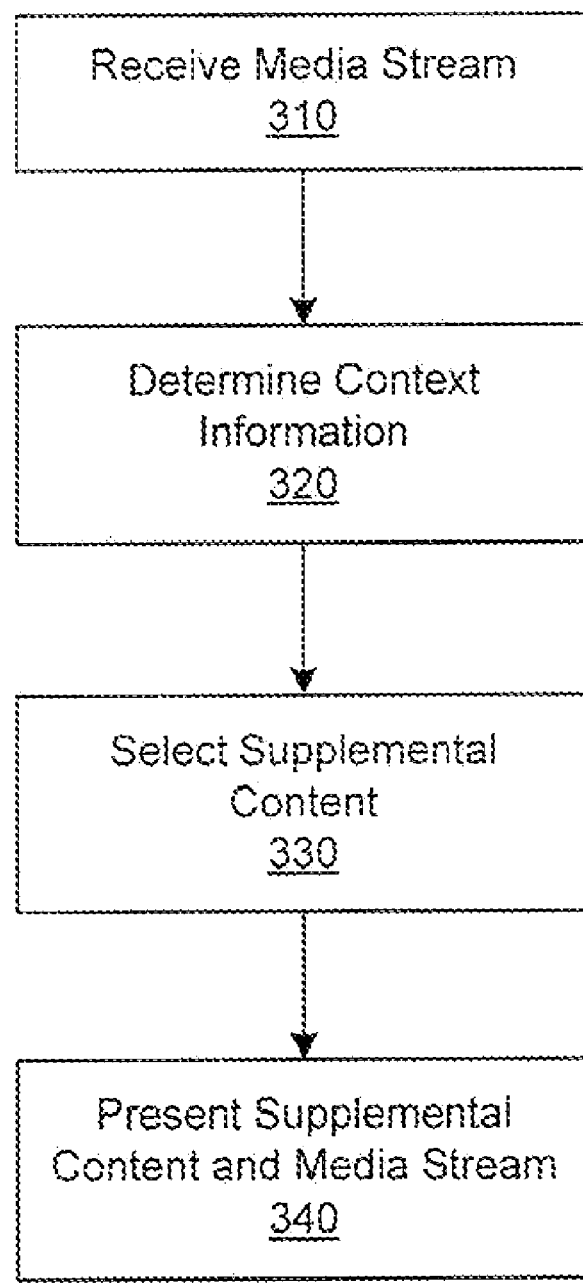
FIG. 3 is a flowchart of a method for selecting and presenting context-relevant supplemental content for a media stream, according to one embodiment of the invention.

FIG. 3 is a flowchart of a process of the context system 210 for selecting and presenting context-relevant supplemental content in accordance with one embodiment of the invention. This process may be implemented in software, hardware, or a combination of hardware and software. In one embodiment, a part or the whole process may be implemented in the source system 110 and/or the destination system 180.

As illustrated in FIG. 3, the context system 210 receives 310 a media stream from the source system 110. The context system 210 then determines 320 context information about the media stream. Based at least in part on the determined context information, the context system 210 selects 330 supplemental content and presents 340 the supplemental content and the media stream via a destination system 180. Further detailed for each step of the process are described below.

Receiving the Media

The context system 210 receives 310 the media stream from the source system 110. In one embodiment, the media stream is delivered to the context system 210 through broadcast distribution either over the air (e.g., traditional radio and television broadcasting) or through a broadcast network (e.g., cable radio and cable television). In another embodiment, the media stream may be delivered to the context system 210 upon demand (e.g., through a video on demand service). Alternatively, the media stream may be obtained from a device that is configured to playback locally stored media streams.

In one embodiment, the media stream is sent to the context system 210 as a series of small packets from a single source (e.g., a media server) or multiple sources (e.g., multiple computers in a peer-to-peer network where the media stream is distributedly stored). The media stream may be sent using Datagram protocols. Depending on how the context system 210 is configured to determine 320 the context information, the context system 210 may or may not assemble the packets to construct the media stream.

Determining the Context Information

The context system 210 determines 320 context information about the received media stream. Many different types of context information may be used in embodiments of the system. For example, the context information may be related to (1) the content within the media stream, (2) the destination system 180, and/or (3) the user (e.g., viewer or consumer) of the media stream. As is described in greater detail below, the context system 210 may determine 320 the context information using any of a variety of methods.

In one embodiment, the context system 210 has one or more desired schemes for providing supplemental content. For example, the context system 210 may be configured to provide content-relevant advertisements for some advertisers. These desired schemes may favor some context information over others. Depending on what context information is desired, the context system 210 may use various methods to determine 320 the context information.

One type of context information relates to the content within the media stream (content-relevant context information). This type of context information may include any information about the media stream, such as the name of a program in the stream, actors in the program, genre of the program. For example, for a media stream including a clip of a baseball game, the context information may include the identity of the baseball player at bat.

One method to determine 320 the content-relevant context information uses text transcripts of the media stream. Broadcasting is often accompanied by text transcripts for the hearing impaired. The text transcripts include transcript of the video program and/or advertisement that is currently being broadcasted. These text transcripts may be included in metadata such as closed captioning and teletext. Depending on the video transmission standard and/or the delivery mechanism, the text transcripts can be transmitted using a variety of methods. For example, the closed captioning can be contained within the Vertical Blanking Interval (VBI) according to the NTSC standard. As another example, the text transcripts can be embedded in the IP packets of the media stream.

Because the text transcripts include a (nearly) literal transcript of the content in the media stream, they likely contain very useful information for determining content-relevant context information. The text transcripts could contain information which indicates the genre of a media program in the media stream, the title of the media program, or the precise content or dialog that is the focus of the media program and/or advertisements at any point during the media program. For example, through the processing of the closed capturing transmitted during an airing of the television program Daily Show, the context system 210 can determine 320 that the viewer is watching the "Daily Show," that the host is "Jon Stewart," that the guest is "David Sedaris," that the name of the new book Mr. Sedaris is writing is "Me Talk Pretty One Day," and that the topics covered during the show were "the war in Iraq," "Chief Justice Roberts," and "Wal-Mart." In addition, the natures and sponsors of the various advertisements (e.g., "Ford" and "Mustang") presented during the program may be similarly determined 320.

As described above, the context information may be determined 320 based on the desired schemes for providing supplemental content. For example, if the desired schemes include advertisements for major retailers and automobile manufacturers, the content-relevant context information determined 320 for the Daily Show program will include terms such as "Wal-Mart," "Ford," and "Mustang," not terms such as "the war in Iraq."

In one embodiment, the context system 210 can determine 320 the context information in real time as it receives 310 the relevant content in the media stream. This can be important for the supplemental content providers. For example, a company may want to show its advertisement to a user soon after media content related to the company is presented to the user.

Another method to determine 320 the content-relevant context information uses text messages displayed graphically in the video content in the media stream. In one embodiment, the context system 210 can determine 320 the text messages using optical character recognition (OCR) technology. By translating the graphical text messages into recognizable words, the text messages displayed may then be used to determine 320 the content-relevant context information.

Other methods of determining 320 the content-relevant context information include object recognition, voice recognition, and other content recognition by processing the content of the media stream using a variety of algorithms. This enables the context system 210 to determine 320 content-relevant context information by identifying objects that are shown and words that are spoken in the media stream.

In one embodiment, a content provider can put a certain signal in the media stream (e.g., an identifier in the VBI) to indicate the presence of a specific content. The context system 210 may be configured to detect and recognize these signals and determine 320 context information accordingly. In another embodiment, the context system 210 may use media fingerprints to determine 320 context information about the media stream. A characteristic digital fingerprint may be generated for a portion of a media program (such as an audio portion of the media, or a time period thereof). The digital fingerprint may then be referenced against a database of fingerprints for known media items, and thereby be used to identify the media program or information about it, such as genre, scene changes, and specific programming ID of the media program.

In one embodiment, a content provider can transmit context information (e.g., media fingerprint, text transcripts) in the audio signals of the media stream. For example, the content provider can transmit a content indicator in the sub-audible tone (or other audio tone that is not noticeable to the average listener at normal volume levels) of an audio stream. The context system 210 may be configured to detect and recognize the context information embedded in the audio signals, and thereby use it to determine context information about the received media stream.

The context system 210 may use information from sources other than the media stream to determine 320 the content-related context information. Such sources may be third-party databases, such as web services and electronic program guides (EPG). An EPG contains descriptive information about the content of programs in multiple channels. The context system 210 may retrieve descriptive information from the EPG using identification information such as the date and time when the program is broadcasted, the location of the destination system 180, the service provider and subscribed package (e.g., Comcast basic cable), and the current channel being viewed. The context system 210 may retrieve the identification information from the destination system 180 and/or the source system 110. In one embodiment, the source system 110 is a placeshifting device which can provide such information to the context system 210 along with the media stream.

Another type of context information that may be used to select 230 supplemental content related to the user, the destination system 180, or other information that is not determined solely by the media stream. This type of context information may be called usage-relevant context information (or non-media context information). Examples of usage-relevant context information include configurations and capabilities of the destination system 180 (e.g., type and model of equipped output device, operating system), time and location of the output device playing the media stream, and information about the user (e.g., web browsing histories of the user). The context system 210 may retrieve the usage-relevant context information from the source system 110, the destination system 180, or some other source. For example, the context system 210 may determine 320 the location of the destination system 180 using the IP address of the destination system 180. As another example, the context system 210 may retrieve user registration data from the source system 110. Assuming the destination system 180 includes a personal computer, the context system 210 may use software programs or data located on the computer (such as web histories and Internet cookies) to determine 320 context information about the user.

The context system 210 may also derive additional contextual information based on the determined context information. For example, knowing that the viewer lives in one state (e.g., through user registration data) and is presently viewing media content in another state (e.g., through IP address of the destination system 180), the context system 210 may infer that the viewer is traveling. The inferred context information may be used to select 330 supplemental content that would be highly relevant for a traveler, such as a local restaurant guide for travelers.

Therefore, the context system 210 may determine 320 the content-relevant context information (derived from the media stream itself) and/or the usage-relevant context information (derived from sources other than the media stream) of the media stream.

Selecting Supplemental Content

Once the context information is determined 320, the context system 210 selects 330 supplemental content using that context information. In one embodiment, the context system 210 is configured to select 330 the supplemental content that is most relevant to the user, and thus most valuable to parties of interest (e.g., the user, supplemental content providers).

In one embodiment, the context system 210 uses the context information to select 330 the supplemental content from a collection of supplemental content. The collection of supplemental content may include advertisements or other information that may be relevant to the media. The collection of supplemental content may be stored locally in the context system 210 or externally in devices such as third-party databases and the destination system 180.

In one embodiment, the context system 210 conducts the selection 330 based at least in part on the content-relevant context information. Supplemental content providers (e.g., advertisers) may prefer to provide their supplemental content (e.g., advertisements) with media programs that are relevant in some way to the thing being advertised. For example, a company may want to present its own advertisement to the viewer whenever its competitor's advertisement appears. As another example, a company may want to supplement its own advertisements with additional information or timely offers. Beneficially, the users are more likely to be interested in supplemental information that is relevant to the content of the media program they are watching. For example, a viewer would be more likely to be interested in a brief biography of Chief Justice Roberts if the viewer is watching a television program about the judicial nomination of John Roberts.

In one embodiment, the context system 210 conducts the selection 330 based at least in part on the usage-relevant context information. In one embodiment, the output device of the destination system 180 presenting 340 the media stream may influence the selection 330 of the supplemental content. For example, the context system 210 may select 330 a cellular phone plan advertisement if the user is watching the media via a cellular phone, but select 330 a cable service advertisement if the user is watching via a television or personal computer. In another embodiment, the inventory of the destination system 180 may impact the supplemental content the context system 210 selects 330. For example, if a computer of the destination system 180 has a particular operating system installed, the context system 210 may select 330 an advertisement of a compatible software application which may otherwise not be selected 330. In another embodiment, the past activities of the user may drive the selection 330. For example, cookies on a user's computer may indicate the user's preferences, which may be considered by the context system 210 in selecting 330 the supplemental content to be presented 340 to the user.

In one embodiment, the context system 210 selects 330 the supplemental content based at least in part on statistical data of other users' activity. Supplemental content successful in similar context in the past (e.g., an advertisement with high click rate) tends to remain successful in the near future. Therefore, the context system 210 may select 330 the supplemental content with favorable statistical data over the unfavorable ones, thus increasing the effectiveness of the selected supplemental content. In one embodiment, the context system 210 can use algorithms such as the Bayesian inference to determine a success score for candidate supplemental content items, and select 330 the one with the highest score.

In one embodiment, the context system 210 implements the function for selecting 330 supplemental content as a rule engine. The rule engine may include rules that correspond to logics (or algorithms) the context system 210 uses to conduct the selection 330. The rules may be provided by parties of interest. A rule may be based on content-related context information. For example, a rule may be to select 330 an airline advertisement whenever a program contains the word "Hawaii" two or more times in a media stream. The matching (or filtering) of the words may be literal (e.g., "Cadillac" should trigger content associated with "Cadillac") or associative (e.g., the word "basketball" may be associated with content related to sneakers and other shoes). As another example, a user may set a rule that prohibits the selection 330 of any advertisement for a media program about jewelry. A rule may be based on usage-related context information. For example, an advertiser may set a rule that prohibits the selection 330 of its advertisements when the destination system 180 uses a cellular phone to present 340 the supplemental content. The rules engine thus allows for any rule or combination of rules for the context system 210 to select 330 supplemental content from the collection of context information.

In one embodiment, after selecting 330 the supplemental content, the context system 210 selects a format for the selected supplemental content. The supplemental content may have multiple formats, each of which may be presented differently based on the destination system 180. For example, an advertisement for a particular product may have a video format having a high-resolution video version and a low-resolution version, an audio format for radio listeners, and a web format having an URL pointing to a web page designated to promote the product.

The context system 210 may select a format for the supplemental content based on the context information. A number of factors may be considered in selecting the format of the supplemental content, such as the location of the user, the configuration of the destination system 180, and the format of the media stream. For example, if the user placeshifts video stream from home and views the stream using a laptop computer, the context system 210 may select a shortened low-resolution format of the selected supplemental content. However, if the viewer is watching the same video stream at home using a large screen high-definition television (HDTV), the context system 210 will select a format that can deliver full-length high-resolution of the selected supplemental content on the HDTV. If the context system 210 discovers that the user is watching the same video stream using a mobile wireless device (e.g., a smart phone), it may select an abbreviated format that will be displayed as a scrollbar in the device.

In one embodiment, the context system 210 implements the function for selecting a format for the supplement content using the same rule engine as the one for the function for selecting 330 the supplemental content. Parties of interests (e.g., users or advertisers) may add or modify rules to set their preferences. For example, some advertisers may prefer their advertisements to be in a particular format (e.g., text only), while other advertisers may prefer to display their advertisement together with the media stream and launch a particular web page for the viewers to visit.

In one embodiment, the selection 330 of the supplemental content is conducted by the destination system 180. The context system 210 may send (or transmit) the determined context information to the destination system 180. The destination system 180 may make the selection 330 in manners similar to the ones described above.

Presenting the Supplemental Content

Once the supplemental content is selected 330, the supplemental content and the media stream are presented 340 to users via the destination system 180. In one embodiment, the context system 210 sends (or transmits) the media stream and the supplemental content to the destination system 180 using the same communication channel 230. The supplemental content may accompany the media stream synchronously or asynchronously.

Depending on the formats of the media stream and the supplemental content, the context system 210 may incorporate the supplemental content into the media stream to form a new combined media stream and send the combined stream to the destination system 180. For example, if both the media stream and the supplemental content include video content, the context system 210 may add video content of the supplemental content in front of the video content of the media stream (pre-placement), at the end of the video content of the media stream (post-placement), or above the video content of the media stream (overlay). Alternatively, the supplemental content may be delivered in a different channel and/or by completely different delivery means than the media stream. For example, while the media stream may be sent to the destination system 180 through a computer network, the context system 210 may send 340 the supplemental content offline. For example, the supplemental content may be sent 340 through a phone call, a fax, or the postal service to the user's home. The destination system 180 may combine (or incorporate) the supplemental content and the media stream to present 340 them to the users.

In one embodiment, the supplemental content is stored in the destination system 180 or in a storage device accessible by the destination system 180. Rather than sending the supplemental content to the destination system 180, the context system 210 may send information necessary for the destination system 180 to access the supplemental information. For example, the destination system 180 may have certain advertisements stored in its local storage. Rather than sending an advertisement to the destination system 180, the context system 210 may send an identifier that uniquely identifies the advertisement in the local storage. As another example, the context system 210 may send a uniform resource locator (URL) associated with the supplemental content to the destination system 180, which may then retrieve the supplemental content using the URL through a network. Beneficially, this approach alleviates much of the need for transmission of supplemental content from the context system 210 to the destination system 180.

In one embodiment, the context system 210 only sends the supplemental content to the destination system 180 and not the media stream. In another embodiment, the context system 210 stores (or caches) the media stream and the supplemental content in a local storage device and sends the media stream along with the supplemental content to the destination system 180 at a later time. For example, the context system 210 may also function as a time-shifting or placeshifting device. The context system 210 may include personal video recorder functionality (using local storage to record the media stream received) and tag the recorded media stream with information indicating the content of the programs recorded. On play back, this information can be used to select supplemental content such as context-relevant advertisements and information.

Depending on the format of the supplemental content, the format of the media stream, and/or the configuration of the destination system 180, the destination system 180 may present 340 the supplemental content to the users in a variety of ways. The destination system 180 may present 340 the supplemental content using the same output device as the one used to present 340 the media stream. For example, the destination system 180 may display both the supplemental content and the media stream in the same screen. The supplemental content and the media stream may also be presented 340 using the same application. For example, the destination system 180 may display a television program (media stream) using a media player, and overlay an advertisement (supplemental content) as a scrollbar (or text ticker) on the television program using the media player. Alternatively, the supplemental content and the media stream may be presented 340 using different applications. For example, if the supplemental content includes a URL, the destination system 180 may launch a web browser to display the web page associated with the URL, while displaying the media stream using a media player. One example of the media player is described in more detail in U.S. patent application Ser. No. 11/147,664, filed on Jun. 7, 2005, the content of which are hereby incorporated by reference.

The destination system 180 may present 340 the supplemental content and the media stream using different output devices. For example, the destination system 180 may present 340 a television program (media stream) on a HDTV and print a coupon (supplemental content) using an associated printer.

In one embodiment, the destination system 180 and/or the context system 210 replaces a portion of the media stream with the supplemental content. For example, the destination system 180 may replace an advertisement for a company with a different advertisement for the company that is determined to be more relevant to the user.

Example Process

The process described above can be further illustrated through an example of an operation of the context system 210 in accordance with one embodiment of the invention. In this example, a user is watching a television broadcast of a baseball game using a personal computer through a placeshifting device.

While receiving the television broadcast from a television station, the place shifting device determines that a particular baseball player is at bat. Based on this information, the placeshifting device selects an advertisement for a website that sells sports memorabilia. To do this, the placeshifting device may select a URL for a web page on the website where the viewer can buy an autographed ball from the baseball player that is currently at bat. This selection may also be based in part on information that is not determined from the media stream, such as the user's previously stated preferences or activity (e.g., the user has visited websites that have this player's stats, thus indicating an interest in the player). This supplemental content is then delivered to the user's personal computer with the television broadcasting. As a result, while the user is watching his favorite player at bat during a baseball game on the personal computer, the user also receives an advertisement for the relevant sports memorabilia as well as a link to a web page where the user can easily buy the advertised product.

Advertisement Marketplace Business Model

The systems and methods described above enable a business model in which third parties can register advertising or supplemental content and specify the criteria that trigger it. Context, as defined above, may play a large part in those criteria. The third parties' criteria are used, at least in part, to select the supplemental content to be presented with the media stream. When a third party's advertisement is played, presented or interacted with, the third party is charged a fee. The amount charged may be based on the number of times the advertisement is selected and added to a media stream, for each viewer. In one embodiment, the service includes a web interface for third parties to upload their advertisements or other supplemental content and select or define the criteria to be applied for pairing the supplemental content with the media content presented to viewers.

The service may also allow the third parties to bid amounts of money on certain criteria, where the bid amount is or is related to the price that the third party is charged for the presenting of its content with the media stream. The system may then give priority to third parties' content based on the associated bid amount. This enables an efficient marketplace for advertisements, where prices adapt to a market price for various criteria and content based on demand.

In another aspect of an embodiment of this model, the service that pairs the supplemental content with the original television or video content can be independent from all the primary and secondary content providers. The technologies used to determining context while transporting primary media may serve as a matchmaking virtual marketplace for third parties interested in delivering their supplemental information to a particular set of users. In addition, the transport providers (e.g., the carriers and others) might be included in this model in a variety of ways based on the type of content presented to the user.

In one example of this, an advertising agency may wish to place one million dollars of advertising on computers and mobile devices for its client. By bidding on keywords (skateboard, motocross, etc), genres (for example: sports::extreme) and indicating that it wants to place video content on computers and mobile devices, a spend plan is built around the budget using the service described above. Once buys are in place and confirmed, whenever a 19 year-old placeshifts the X-Games onto his cellular phone, the client is assured that a certain number of airings will include their video advertisement. Money paid by the client may be distributed in different percentages among the primary content owners, the service that enables this business, and the cellular phone carriers, all based upon the tracking data maintained by the enabling service.

The tracking information that can be maintained by the context/content matching business includes performance metrics, including, but not limited to: (1) how often secondary content was presented to users; (2) how often they interacted with the secondary content; (3) where and when the secondary content was presented; (4) which primary content triggered the secondary content; and (5) which networks carried the secondary and primary content. Based on these metrics, the different parties involved can agree upon appropriate ways to split up the revenue stream.

SUMMARY

Embodiments of the invention provide a system and method to pair media content with context-relevant supplemental content and present the media content and the supplemental content to a user.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method executable by a media player, the method comprising:
   receiving a media stream of media content at the media player;
   determining, using the media player, context information from the media content of the received media stream;
   identifying supplemental content by the media player, the supplemental content being related to the context information; and
   providing the media content and the supplemental content for presentation.

2. The method of claim 1, wherein the supplemental content comprises a link to a web page.

3. The method of claim 1, wherein the supplemental content comprises an advertisement.

4. The method of claim 1, wherein the supplemental content comprises scrolling text related to the media content.

5. The method of claim 1, wherein the supplemental content is presented on a media player as an overlay to the media content.

6. The method of claim 1, wherein the supplemental content is embedded in an interface of the media player.

7. The method of claim 1, wherein the supplemental content is presented via launching an application separate from the media player.

8. The method of claim 1, wherein the media stream comprises a broadcast program, and determining the context information about the media stream comprises examining an electronic programming guide to identify the broadcast program.

9. The method of claim 1, wherein the media stream is received from a base station of a placeshifting system.

10. The method of claim 1, further comprising: obtaining the supplemental content from a remote server.

11. The method of claim 1, further comprising: storing the supplemental content on a local storage of a system on which the media player is running; and obtaining the supplemental content from the local storage.

12. The method of claim 1 wherein the media content comprises metadata provided within the media stream, and wherein the determining comprises analyzing the metadata.

13. The method of claim 1 wherein the media content comprises closed captioning information contained within the media stream, and wherein the determining comprises analyzing the closed captioning information.

14. The method of claim 1 wherein the media content comprises audio information contained within the media stream and wherein the determining comprises performing a voice recognition to identify spoken words in the media content.

15. The method of claim 1 wherein the media content comprises text messages displayed graphically within the media stream, and wherein the determining comprises performing an optical character recognition of the text messages.

16. The method of claim 1 wherein the media content comprises graphical objects contained within the media stream and wherein the determining comprises recognizing the graphical objects within the media content.

17. The method of claim 1 wherein the determining comprises analyzing the media content in real time as the media stream is received.

18. The method of claim 1 wherein the determining comprises analyzing the media content in real time.

19. The method of claim 1 further comprising providing the supplemental content and the media content for simultaneous presentation.

20. The method of claim 1 wherein the supplemental content is further selected based upon information about a user of the media player.

21. The method of claim 1 wherein the supplemental content is further selected based upon information about the media player.

22. The method of claim 1 wherein the supplemental content is further selected based upon a location of a user of the media player.

23. The method of claim 1 wherein the providing comprises displaying the supplemental content and the media content on the media player.

24. The method of claim 1 wherein the context information is content-relevant context information.

25. The method of claim 1 wherein the receiving comprises receiving the media stream at a placeshifting device, and further comprising transmitting the supplemental content and the media content to a media player.

26. The method of claim 1 wherein the receiving comprises receiving the media stream at a placeshifting device, wherein the determining and identifying are performed by the placeshifting device, and further comprising transmitting the supplemental content and the media content from the placeshifting device to a media player.

27. The method of claim 1 wherein the receiving comprises receiving the media stream at a media player, and further comprising presenting the supplemental content and the media content on the media player.

28. The method of claim 1 wherein the receiving comprises receiving the media stream at a media player, wherein the determining and identifying are performed by the media player, and further comprising presenting the supplemental content and the media content on the media player.

29. The method of claim 1 wherein the determining comprises analyzing the media content received within the media stream.

30. A method executable by a context system that processes media content that is selected by a viewer and placeshifted to a media player, the method comprising:
   receiving a media stream at the context system, wherein the media stream comprises the media content selected by the viewer;
   using the context system, determining context information from the media content of the received media stream;
   selecting supplemental content based at least in part on the context information; and
   transmitting the media content and the supplemental content from the context system to the media player for presentation to the viewer.

31. The method of 30, wherein the context system is a placeshifting device.

32. The method of claim 30, wherein the supplemental content comprises an advertisement.

33. The method of claim 30, wherein determining the context information comprises examining metadata received with the media stream.

34. The method of claim 30, wherein the context information about the media stream is determined by analyzing text transcripts of an audio portion of the media stream.

35. The method of claim 30, wherein the context information about the media stream is determined by analyzing an audio signal of the media stream.

36. The method of claim 35, wherein the audio signal comprises an audio signal in a subaudible tone.

37. The method of claim 30, wherein determining the context information about the media stream comprises referencing an electronic program guide to identify a broadcast program associated with the media stream.

38. The method of claim 30, further comprising: combining the supplemental content and the media stream into a combined stream at the context system; and transmitting the combined stream from the context system to a destination system.

39. The method of claim 30, further comprising: combining the supplemental content and the media stream into a combined stream.

40. The method of claim 30, further comprising: sending the supplemental content to a first output device and sending the media stream to a second output device, the first and second output devices being different.

41. The method of claim 30, further comprising synchronously presenting the media stream and the supplemental content.

42. The method of claim 30, further comprising synchronously presenting the media stream and the supplemental content.

43. The method of claim 30, wherein the supplemental content is selected based at least in part on usage-relevant context information.

44. The method of claim 43, wherein the usage-relevant context information includes at least one of a configuration and a capability of the media player.

45. The method of claim 43, wherein the usage-relevant context information includes information about the viewer.

46. The method of claim 43, wherein the usage-relevant context information includes at least one of a location of the media player and a time when the media stream is presented.

47. The method of claim 30, wherein the media stream comprises audio and video information.

48. The method of claim 30, wherein the supplemental content is presented as an overlay on the media stream.

49. The method of claim 30, wherein the supplemental content is presented as a web page.

50. The method of claim 30, wherein the supplemental content is presented as scrolling text on the media stream.

51. The method of claim 30 further comprising transmitting the supplemental content and the media content to a media player.

52. The method of claim 30 wherein the determining comprises analyzing the media content received within the media stream.

53. The method of claim 30 further comprising providing the supplemental content and the media content to a destination system.

54. The method of claim 30 wherein the receiving comprises receiving the media stream at a media player, and further comprising presenting the supplemental content and the media content on the media player.

55. A computer program product comprising a computer-readable medium containing computer program code for performing the method comprising:
   receiving media content for presentation by a media player;
   determining context information from the received media content using the media player;
   identifying supplemental content using the media player, the supplemental content being related to the context information; and
   presenting the supplemental content and the media content on the media player.

56. The computer program product of claim 55 wherein the determining comprises analyzing the media content received within the media stream.

57. A computer program product to process media content that is selected by a viewer and that is place shifted from a source system to a destination system, the computer program product comprising a computer-readable medium containing computer program code for performing the method comprising:
   receiving a media stream from the source system that comprises the media content selected by a viewer;
   determining context information from the media content of the received media stream;
   selecting supplemental content based at least in part on the context information; and
   providing the supplemental content and the media content to the destination system for presentation to the viewer.

58. The computer program product of claim 57 wherein the determining and selecting are performed by a placeshifting device, and wherein the providing comprises transmitting the supplemental content and the media content to the destination system.

59. The computer program product of claim 57 wherein the determining comprises analyzing the media content received within the media stream.

60. A method executable by a data processing system that processes media content that is selected by a viewer and placeshifted to a media player, the method comprising:
   receiving a media stream comprising the media content selected by the viewer at a data processing system;

determining context information by analyzing the media content received within the media stream at the data processing system;

selecting supplemental content using the data processing system, wherein the supplemental content is based on the context information; and transmitting the supplemental content and the media content from the data processing system over a network to the media player for presentation to the viewer.

61. The method of claim 60 wherein the context information is content-relevant context information.

* * * * *